(12) United States Patent
Ding et al.

(10) Patent No.: US 11,200,123 B2
(45) Date of Patent: Dec. 14, 2021

(54) CONSENSUS PROCESS RECOVERY METHOD AND RELATED NODE

(71) Applicant: Huawei Technologies Co., Ltd., Shenzhen (CN)

(72) Inventors: Jian Ding, Hangzhou (CN); Xun Liu, Hangzhou (CN); Zhao Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/847,171

(22) Filed: Apr. 13, 2020

(65) Prior Publication Data

US 2020/0241981 A1    Jul. 30, 2020

Related U.S. Application Data

(63) Continuation of application No. PCT/CN2019/081998, filed on Apr. 10, 2019.

(30) Foreign Application Priority Data

Jul. 30, 2018 (CN) .......................... 201810859769.7

(51) Int. Cl.
*G06F 11/20* (2006.01)
*G06F 11/07* (2006.01)
(Continued)

(52) U.S. Cl.
CPC ...... *G06F 11/2028* (2013.01); *G06F 11/0709* (2013.01); *G06F 21/44* (2013.01); *H04L 9/3247* (2013.01); *H04L 67/1051* (2013.01)

(58) Field of Classification Search
CPC .............. H04L 9/3247; H04L 67/1051; G06F 11/2028; G06F 11/0709; G06F 21/44
See application file for complete search history.

(56) References Cited

U.S. PATENT DOCUMENTS 9,632,892 B1 * 4/2017 Sledz ................... G06F 16/178
2015/0341205 A1 * 11/2015 Invernizzi ........... H04L 67/2814
370/219

(Continued)

FOREIGN PATENT DOCUMENTS

CN    106161495 A    11/2016
CN    106789095 A    5/2017
(Continued)

OTHER PUBLICATIONS

Nakamoto, S., "Bitcoin: A Peer-to-Peer Electronic Cash System," Oct. 31, 2008, 10 pages.
(Continued)

*Primary Examiner* — Azizul Choudhury
(74) *Attorney, Agent, or Firm* — Conley Rose, P.C.

(57) ABSTRACT

A consensus process recovery method and a related node, where the method includes determining, by a plurality of nodes, a target instance from one or more secondary instances, where a throughput of the target instance is higher than a throughput of a primary instance, and obtaining, by a first node and all second nodes, a consensus to replace the primary instance with the target instance as a new primary instance, where the second nodes are backup nodes running the target instance, and the first node is a primary node running the target instance.

14 Claims, 10 Drawing Sheets

(51) Int. Cl.
  *G06F 21/44* (2013.01)
  *H04L 29/08* (2006.01)
  *H04L 9/32* (2006.01)

(56) References Cited

U.S. PATENT DOCUMENTS

2017/0323392 A1    11/2017  Kasper et al.
2019/0087605 A1*    3/2019  Jensen ................ G06F 21/6218
2019/0235946 A1     8/2019  Guo et al.

FOREIGN PATENT DOCUMENTS

| CN | 107579848 A | 1/2018 |
| CN | 107819749 A | 3/2018 |
| CN | 108108967 A | 6/2018 |
| CN | 108134706 A | 6/2018 |

OTHER PUBLICATIONS

Aublin, P., et al., "RBFT: Redundant Byzantine Fault Tolerance," 2013 IEEE 33rd International Conference on Distributed Computing Systems, Jul. 8-11, 2013, 10 pages.
Woos, D., "Planning for Change in a Formal Verification of the Raft Consensus Protocol," CPP 16, Jan. 18-19, 2016, St. Petersburg, FL, USA, 12 pages.

* cited by examiner

CONSENSUS PROCESS RECOVERY METHOD AND RELATED NODE

CROSS-REFERENCE TO RELATED APPLICATIONS

This application is a continuation of International Patent Application No. PCT/CN2019/081998 filed on Apr. 10, 2019, which claims priority to Chinese Patent Application No. 201810859769.7 filed on Jul. 30, 2018. The disclosures of the aforementioned applications are hereby incorporated by reference in their entireties.

TECHNICAL FIELD

The present disclosure relates to the field of big data technologies, and in particular, to a consensus process recovery method and a related node.

BACKGROUND

A blockchain is a chained data structure in which data blocks are combined in sequence and also a non-tampered and unforgeable distributed ledger that is ensured cryptographically. When resolving a problem of negotiating between nodes and deciding how to generate a new block, an existing node cluster implementing a blockchain solution uses a practical byzantine fault tolerance (PBFT) algorithm for performing a consensus. Consensus efficiency is a core competence of a service externally provided by a blockchain. A core theory of the PBFT algorithm is $n \geq 3f+1$, where n is a total quantity of nodes in the node cluster, and f is a maximum quantity of nodes in which a fault is allowed to occur. To be specific, when there are no more than f nodes with byzantine fault tolerance (for example, sending malicious error information), other nodes without byzantine fault tolerance in the node cluster can finally obtain a correct consensus result, that is, each node without byzantine fault tolerance can obtain a correct consensus result after receiving 2f+1 correct messages.

The node cluster includes a primary node, and nodes other than the primary node are backup nodes. The primary node undertakes more tasks in a consensus process, for example, receiving a data processing request sent by a client, and then sending key information in the request to all other nodes in the node cluster such that nodes in the node cluster perform a consensus on the data. Once the primary node fails, the nodes in the node cluster re-vote a new primary node. A contention-based vote manner is usually used in a vote process. A large amount of information is exchanged between the nodes during the contention process (because a quantity of nodes in the node cluster tends to be large). This process lasts for a period of time. If data requires a consensus during this period, a consensus process is performed after a new primary node is determined. That is, the consensus process may be interrupted due to failure of a primary node, and how to quickly recover an interrupted consensus process is a technical problem that a person skilled in the art needs to resolve.

SUMMARY

Embodiments of the present disclosure disclose a consensus process recovery method and a related node, to resolve a problem that a consensus process recovery speed is relatively low after a primary node fails in a consistency processing process.

According to a first aspect, an embodiment of this application provides a cluster system. The cluster system includes a plurality of nodes, the plurality of nodes jointly run a plurality of instances, each of the plurality of instances is jointly run by the plurality of nodes, and there is one primary instance and one or more secondary instances in the plurality of instances. For each instance, one of the plurality of nodes serves as a primary node corresponding to the instance. A plurality of primary nodes corresponding to the plurality of instances are different nodes.

In the foregoing cluster system, the plurality of nodes jointly run the plurality of instances, and primary nodes corresponding to the instances are different. Therefore, when a problem occurs in a primary node of an instance, it does not mean that a problem also occurs in primary nodes of other instances, thereby avoiding a problem that the cluster system cannot run normally due to a failure of one instance.

In a first possible implementation of the first aspect, a first node sends a service request to each of second nodes, where the first node is a primary node corresponding to one of the plurality of instances, and the second nodes are backup nodes corresponding to the one instance, the first node receives first authentication information returned by the second node, where the first authentication information includes a signature of the second node, and the first authentication information indicates that the second node authenticates the service request successfully, if a quantity of pieces of first authentication information received by the first node exceeds a second preset threshold, the first node performs the service request, and the first node sends first acknowledgement information to each of the second nodes, where the first acknowledgement information includes the service request and signatures that are of the second nodes and that are in all the first authentication information received by the first node, and the first acknowledgement information is used to enable the second node to perform the service request.

It can be learned that, in a consistency processing process, no back-and-forth acknowledgement needs to be performed between the second nodes, and each second node can determine, only using the first acknowledgement information that is sent by the first node and that carries the signatures of the second nodes, whether second nodes other than the second node agree to perform the service request. Because mutual acknowledgement between the second nodes is omitted, communication complexity is greatly reduced.

In a second possible implementation of the first aspect, the plurality of nodes are configured to determine a target instance from the one or more secondary instances, where a throughput of the target instance is higher than a throughput of the primary instance, and the plurality of nodes are configured to reach a consensus between the plurality of nodes, to enable the target instance to replace the primary instance as a new primary instance. To be specific, therefore, when the primary instance of the plurality of instances cannot run normally due to a failure of the primary node, the plurality of nodes do not need to re-vote a primary node, but directly determine a target instance from existing instances based on a throughput value of each instance, and substitute the target instance as a new primary instance, thereby improving failure recovery efficiency.

According to a second aspect, an embodiment of this application provides a consensus process recovery method. The method is applied to a node cluster, and the node cluster includes a plurality of nodes. The plurality of nodes jointly run a plurality of instances, each of the plurality of instances is jointly run by the plurality of nodes, and there is one primary instance and one or more secondary instances in the plurality of instances. For each instance, one of the plurality of nodes serves as a primary node of the instance, and remaining nodes serve as backup nodes of the instance. A plurality of primary nodes corresponding to the plurality of instances are different nodes. The method includes determining, by one or more of the plurality of nodes, a target instance from the one or more secondary instances, where a throughput of the target instance is higher than a throughput of the primary instance, and reaching, by a first node and all second nodes, a consensus to replace the primary instance with the target instance as a new primary instance, where the second nodes are backup nodes running the target instance, and the first node is a primary node running the target instance.

It can be learned that the node cluster jointly runs the one primary instance and the one or more secondary instances, and when the throughput of the primary instance is relatively small and the primary instance cannot run normally, the node cluster directly selects the new primary instance from the one or more secondary instances, instead of performing a large amount of information exchange again to establish a new primary instance. Therefore, when the original primary instance cannot run normally, the new primary instance can immediately replace the original primary instance to perform a consensus process such that the consensus process can be quickly recovered after interruption.

In a first possible implementation of the second aspect, the method further includes detecting, by one or more of the plurality of nodes, a throughput of each of the plurality of instances, and determining, by the first node, the target instance from the one or more secondary instances based on the throughput of each instance.

In a second possible implementation of the second aspect, all the instances are used to process a service request, and the method further includes sending, by the first node, the service request to each of the second nodes, receiving, by the first node, first authentication information returned by the second node, where the first authentication information includes a signature of the second node, and the first authentication information indicates that the second node authenticates the service request successfully, if a quantity of pieces of first authentication information received by the first node exceeds a second preset threshold, performing, by the first node, the service request, and sending, by the first node, first acknowledgement information to each of the second nodes, where the first acknowledgement information includes the service request and signatures that are of the second nodes and that are in all the first authentication information received by the first node, and the first acknowledgement information is used to enable the second node to perform the service request.

It can be learned that, in a consistency processing process, the second node of the target instance does not need to perform back-and-forth acknowledgement with other backup nodes of the target instance, and each backup node of the target instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

In a third possible implementation of the second aspect, the reaching, by a first node and all second nodes, a consensus to replace the primary instance with the target instance as a new primary instance includes sending, by the first node, a replacement request to each of the second nodes, where the replacement request is used to request to replace the primary instance with the target instance as the new primary instance, receiving, by the first node, second authentication information returned by the second node, where the second authentication information includes a signature of the second node, and the second authentication information indicates that the second node authenticates the replacement request successfully, if a quantity of pieces of second authentication information received by the first node exceeds a third preset threshold, replacing, by the first node, the primary instance with the target instance as the new primary instance, sending, by the first node, second acknowledgement information to each of the second nodes, where the second acknowledgement information includes signatures that are of the second nodes and that are in all the second authentication information received by the first node, and the second acknowledgement information is used to instruct each of the second nodes to perform the replacement request, to replace the primary instance with the target instance as the new primary instance.

It can be learned that, in a process of switching the primary instance, the second node of the target instance does not need to perform back-and-forth acknowledgement with other backup nodes of the target instance, and each backup node of the target instance can determine, only using the second acknowledgement information that is sent by the first node and that carries signatures of backup nodes, whether backup nodes other than the backup node agree to perform the service request. Because mutual acknowledgement between the backup nodes is omitted, communication complexity is greatly reduced.

In a fourth possible implementation of the second aspect, some of a plurality of backup nodes of any one of the plurality of instances are alternate primary nodes of the any one instance, and the alternate primary nodes of the any one instance are configured to replace a primary node of the any one instance to become a new primary node of the any one instance. It can be understood that, an alternate primary node is configured for each primary node, and a new primary node can be quickly selected from the configured alternate primary node during replacement of the primary node, instead of blindly voting a new primary node from such a large-range node cluster. This not only improves vote efficiency of a primary node, but also reduces communication between nodes.

In a fifth possible implementation of the second aspect, alternate primary nodes of any two of the plurality of instances are not duplicate such that a collision can be avoided when a new primary node is substituted.

In a sixth possible implementation of the second aspect, some of a plurality of backup nodes of any one of the plurality of instances are alternate primary nodes of the any one instance, and there is a priority order between the alternate primary nodes of the any one instance. That the alternate primary nodes of the any one instance are configured to replace a primary node of the any one instance to become a new primary node of the any one instance includes that according to the priority order, an alternate primary node that has a highest priority in the alternate primary nodes of the any one instance is configured to replace the primary node of the any one instance to become the new primary node of the any one instance. It can be understood that, a priority can be used to further specify an order for voting a new primary node, to avoid relatively large communication pressure caused by a blind vote.

In a seventh possible implementation of the second aspect, there is the following relationship between a quantity L of instances in the plurality of instances and a quantity N of nodes in the node cluster $L \geq \lfloor (N-1)/3 \rfloor + 1$, and N is an integer greater than or equal to 3.

Considerations for such a setting are as follows. There is a premise at the beginning of designing a byzantine fault tolerance mechanism, that is, up to f nodes in N nodes participating in a consensus are allowed to be unreliable (for example, tampering with transaction information or performing some non-compliance processing on the transaction information), where $N \geq 3f+1$. In the present disclosure, at least one of all the L instances is valid, otherwise, a consensus result is meaningless. A quantity of invalid instances that may occur is f, that is, each of the foregoing f unreliable nodes serves as a primary node (primary node) of one instance. Therefore, provided that $L \geq f+1$, it can be guaranteed that at least one valid instance exists. Based on the relationship between N and f and the relationship between f and L that are illustrated above, the relationship between the quantity L of instances and the quantity N of nodes can be obtained.

According to a third aspect, an embodiment of this application provides a consensus method, and the method includes sending, by a first node, a service request to each of second nodes, where the first node is a primary node running an instance, and the second node is a backup node running the instance, receiving, by the first node, first authentication information returned by the second node, where the first authentication information includes a signature of the second node, and the first authentication information indicates that the second node authenticates the service request successfully, if a quantity of pieces of first authentication information received by the first node exceeds a second preset threshold, performing, by the first node, the service request, and sending, by the first node, first acknowledgement information to each of the second nodes, where the first acknowledgement information includes the service request and signatures that are of the second nodes and that are in all the first authentication information received by the first node, and the first acknowledgement information is used to enable the second node to perform the service request.

It can be learned that, in a consistency processing process, the second node of the instance does not need to perform back-and-forth acknowledgement with other backup nodes of the instance, and each backup node of the instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

According to a fourth aspect, an embodiment of this application provides a consensus method, and the method includes receiving, by a second node, a service request sent by a first node, where the first node is a primary node running an instance, and the second node is a backup node running the instance, authenticating, by the second node, the service request to generate first authentication information, where the first authentication information includes a signature of the second node, and the first authentication information indicates that the second node authenticates the service request successfully, sending, by the second node, the first authentication information to the first node such that the first node performs the service request and sends a first acknowledgement message to the second node when a quantity of pieces of first authentication information received exceeds a second preset threshold, where the first acknowledgement message includes the signature that is of the second node and that is in all the first authentication information received by the first node, and if the first acknowledgement message sent by the first node is received, performing, by the second node, the service request based on the first to-be-authenticated information.

It can be learned that, in a consistency processing process, the second node of the instance does not need to perform back-and-forth acknowledgement with other backup nodes of the instance, and each backup node of the instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

According to a fifth aspect, an embodiment of this application provides a node, and the node includes a sending unit, a receiving unit, and an execution unit. The sending unit is configured to send a service request to each of second nodes, where the node is a primary node running an instance, and the second node is a backup node running the instance, the receiving unit is configured to receive first authentication information returned by the second node, where the first authentication information includes a signature of the second node, and the first authentication information indicates that the second node authenticates the service request successfully, the execution unit is configured to when a quantity of pieces of first authentication information received by the receiving unit exceeds a second preset threshold, perform the service request, and the sending unit is configured to send first acknowledgement information to each of the second nodes, where the first acknowledgement information includes the service request and signatures that are of the second nodes and that are in all the first authentication information received by the node, and the first acknowledgement information is used to enable the second node to perform the service request.

It can be learned that, in a consistency processing process, the second node of the instance does not need to perform back-and-forth acknowledgement with other backup nodes of the instance, and each backup node of the instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

According to a sixth aspect, an embodiment of this application provides a node, and the node includes a receiving unit, an authentication unit, a sending unit, and an execution unit. The receiving unit is configured to receive a service request sent by a first node, where the first node is a primary node running an instance, and the node is a backup node running the instance, the authentication unit is configured to authenticate the service request to generate first authentication information, where the first authentication information includes a signature of the node, and the first authentication information indicates that the node authenticates the service request successfully, the sending unit is configured to send the first authentication information to the first node such that the first node performs the service request and sends a first acknowledgement message to the node when a quantity of pieces of first authentication information received exceeds a second preset threshold, where the first acknowledgement message includes the signature that is of the node and that is in all the first authentication information received by the first node, and the execution unit is configured to perform the service request based on the first to-be-authenticated information when the first acknowledgement message sent by the first node is received.

It can be learned that, in a consistency processing process, the second node of the instance does not need to perform back-and-forth acknowledgement with other backup nodes of the instance, and each backup node of the instance can determine, only using first acknowledgement information that is sent by the first node and that carries signatures of backup nodes, whether backup nodes other than the backup node agree to perform the service request. Because mutual acknowledgement between the backup nodes is omitted, communication complexity is greatly reduced.

According to a seventh aspect, an embodiment of this application provides a node. The node includes a processor and a memory, the memory is configured to store a program instruction, and when the processor invokes the program instruction, the method described in the third aspect is implemented.

According to an eighth aspect, an embodiment of this application provides a node. The node includes a processor and a memory, the memory is configured to store a program instruction, and when the processor invokes the program instruction, the method described in the fourth aspect is implemented.

According to a ninth aspect, an embodiment of this application provides a computer readable storage medium. The computer readable storage medium stores an instruction, and when the instruction is run on a processor, the method described in the third aspect is implemented.

According to a tenth aspect, an embodiment of this application provides a computer readable storage medium. The computer readable storage medium stores an instruction, and when the instruction is run on a processor, the method described in the fourth aspect is implemented.

By implementing the embodiments of this application, the node cluster jointly runs the plurality of instances, and when the primary instance cannot run normally, the node cluster directly selects the new primary instance from the plurality of instances, instead of performing a large amount of information exchange again to re-establish a new primary instance. Therefore, when the original primary instance cannot run normally, the new primary instance can immediately replace the original primary instance to perform consistency processing, thereby avoiding a relatively large delay of the consistency processing caused by replacing an instance.

BRIEF DESCRIPTION OF DRAWINGS

The following describes accompanying drawings used in some embodiments of the present disclosure.

DESCRIPTION OF EMBODIMENTS

In other approaches, nodes in a node cluster jointly run an instance, and consistency processing is performed on a transaction using the instance. Once the instance cannot run normally, all the nodes in the node cluster need to perform re-negotiation, to vote a new instance for consistency processing. A process of re-voting a consistency instance takes a relatively long time, and during this period, a consistency processing task is equivalent to being suspended. According to embodiments of this application, suspension of a consistency processing process that is caused by re-voting of a consistency instance can be avoided. The following describes the embodiments of the present disclosure with reference to the accompanying drawings in the embodiments of the present disclosure.

Figure 1:
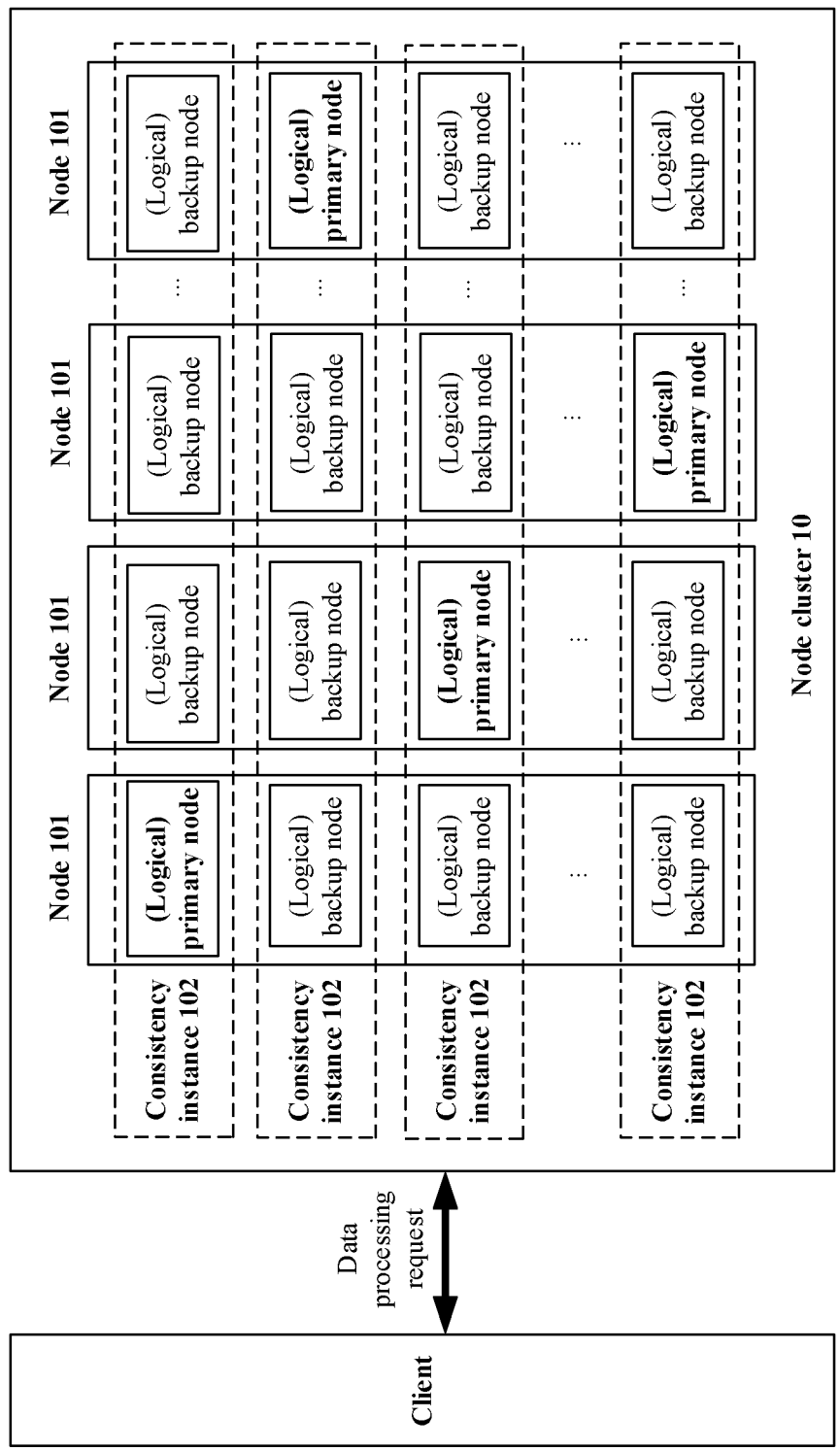
FIG. 1 is a schematic structural diagram of a node cluster according to an embodiment of the present disclosure.

FIG. 1 is a schematic structural diagram of a node cluster 10 according to an embodiment of the present disclosure. The node cluster 10 includes a plurality of nodes 101, and the node cluster 10 runs a plurality of instances 102.

Each instance 102 is jointly run by the node cluster. Further, each node 101 in the node cluster 10 may be divided into a plurality of logical nodes, each logical node may serve as a running node of an instance, the plurality of logical nodes on one node 101 may separately serve as running nodes of different instances, and any two logical nodes on one node cannot simultaneously serve as a running node of one instance. For any instance, each node that is in the plurality of nodes and that does not fail needs to provide a logical node as a running node of the instance.

The node cluster includes one primary node and one or more backup nodes that run each instance. Further, any instance needs to be jointly run by a plurality of logical nodes, and the plurality of logical nodes need to include one primary node and one or more backup nodes. To be specific, in the plurality of nodes included in the node cluster, a logical node of one node needs to serve as a primary node of the instance, and logical nodes of remaining nodes serve as backup nodes of the instance. In addition, any node in the node cluster serves as a primary node of one instance at most.

In addition, the plurality of instances include one primary instance and one or more secondary instances, each of the plurality of instances is used to perform a service request (for example, generating a block based on transaction information), and the primary instance of the plurality of instances is further used to store a result of performing a service request in a disk (for example, if a block is generated, storing the generated block in a disk), where the disk storage means storage in a magnetic disk, and usually means permanent storage or long-term storage, rather than short-term storage such as caching. In addition, the secondary instance does not store a result of performing a service request in a disk. For example, the secondary instance may only cache a generated block, or may not store a block at all after generating the block.

Figure 2:
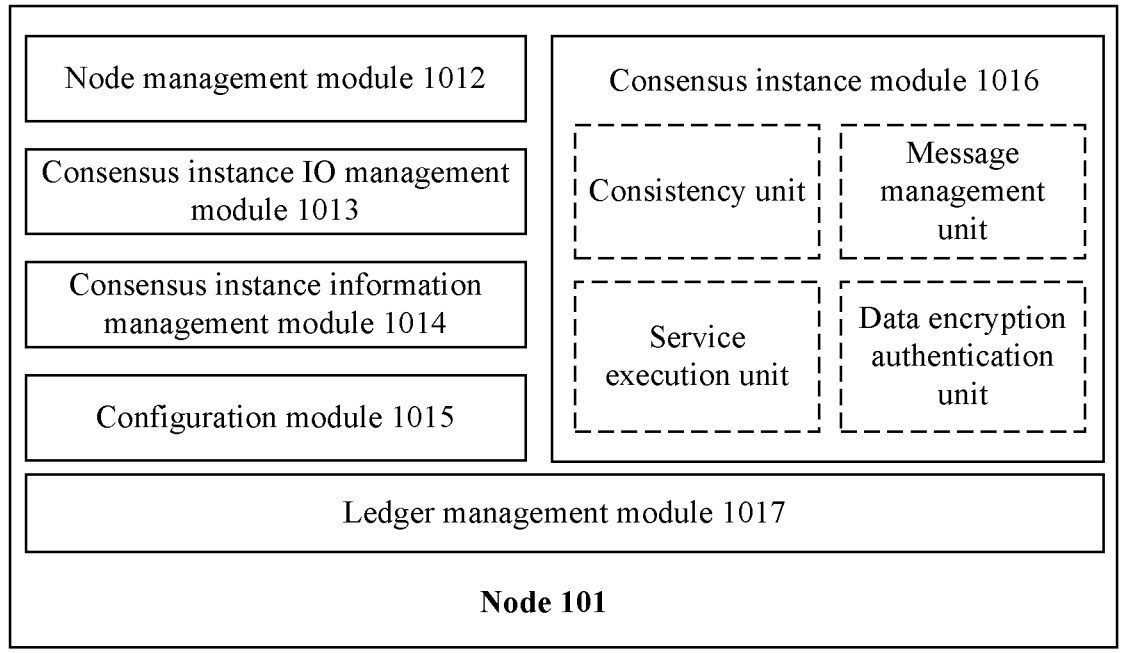
FIG. 2 is a schematic structural diagram of a node according to an embodiment of the present disclosure.

FIG. 2 is a schematic structural diagram of a node 101 according to an embodiment of this application. The node 101 may be any node in the node cluster 10 of FIG. 1. The node 101 includes a node management module 1012, a consensus instance input/output (IO) management module 1013, a consensus instance information management module 1014, a configuration module 1015, a consensus instance module 1016, and a ledger management module 1017. The following describes each module and unit.

The node management module 1012 is responsible for node management, including node initiation, and decision and execution of switching primary and secondary instances.

The consensus instance IO management module 1013 is configured to perform IO monitoring on each running instance in order to obtain a throughput status of each instance.

The consensus instance information management module 1014 is configured to maintain information of each instance on a node, including a role (a primary node or a backup node) that a current node plays in each instance, an access address, port information, and the like.

The configuration module 1015 is responsible for reading and loading an initial parameter required when a node runs.

The consensus instance module 1016 includes a consistency unit, a message management unit, a service execution unit, and a data encryption authentication unit. The consistency unit is configured to perform a consensus on an instance. The message management unit is configured to receive and send a message of an instance, where the message may finally pass through a foregoing communications module. The service execution unit is configured to perform a service based on a service request (for example, packaging a transaction and creating a block). The data encryption authentication unit is configured to authenticate validity of a message and data, and perform encryption and decryption on the message and the data.

The ledger management module 1017 is configured to maintain blockchain information on a node.

Figure 3:
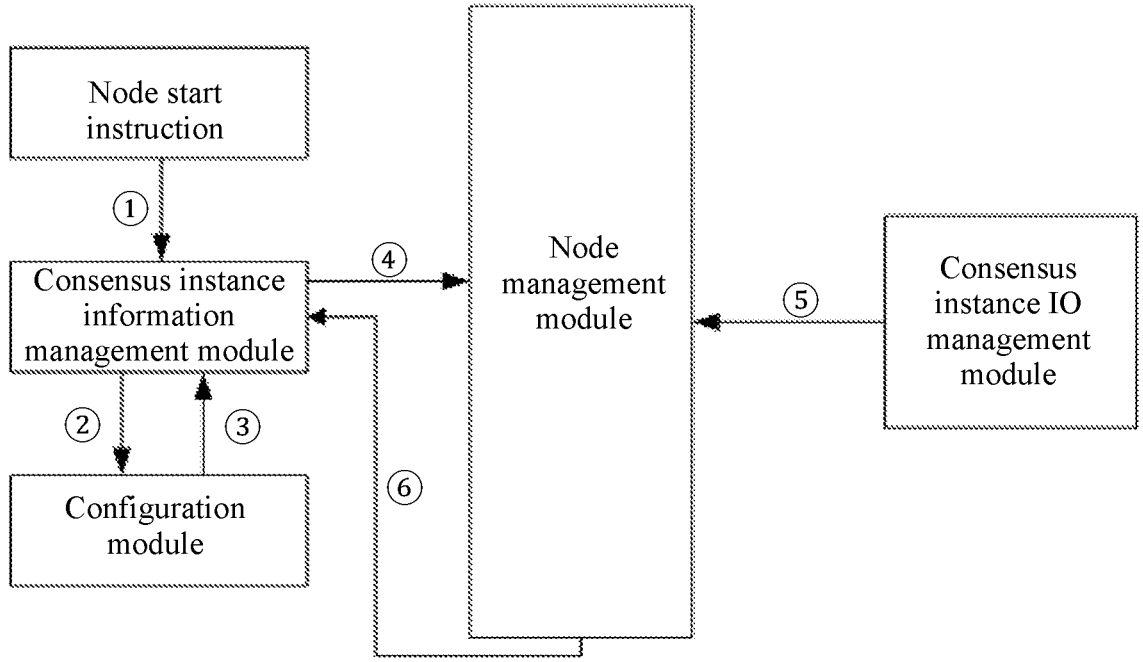
FIG. 3 is a schematic flowchart of a data consensus method according to an embodiment of the present disclosure.

FIG. 3 shows a general execution process of the foregoing modules, and details are as follows. (1) The consensus instance information management module receives a node start instruction. (2) The consensus instance information management module obtains configuration information from the configuration module. (3) The configuration module obtains and generates the configuration information from the outside, and returns the configuration information to the consensus instance information management module. (4) The consensus instance information management module loads the configuration information to start, and returns a start result to the node management module (or may feedback the start result to a user triggering the node start). (5) The node management module obtains a throughput rate of each instance from the consensus instance IO management module. (6) The node management module instructs the consensus instance information management module to change a secondary instance into a primary instance based on the throughput rate of each instance.

It can be understood that, the modules and units in FIG. 2 are function modules divided based on functions. In a specific implementation, some of the function modules may be subdivided into more small function modules, and some function modules may be alternatively combined into one function module. However, regardless of whether these function modules are subdivided or combined, there is no substantial impact on the node for implementing a method process of this application. Generally, each function module corresponds to respective program code (or a program instruction). When the program code corresponding to each function module runs on a processor, the function module is enabled to perform a corresponding process in order to implement a corresponding function.

Figure 4:
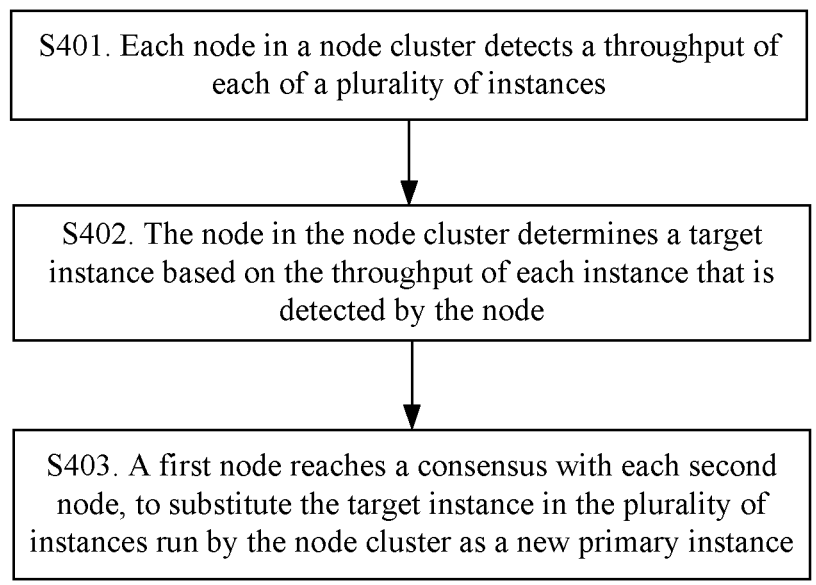
FIG. 4 is a schematic flowchart of a consensus process recovery method according to an embodiment of the present disclosure.

FIG. 4 is a schematic flowchart of a consensus process recovery method according to an embodiment of the present disclosure. The method may be implemented based on the node cluster shown in FIG. 1 or may be implemented based on another architecture. The method includes but is not limited to the following steps.

An instance switching process is as follows.

Step S401: Each node in the node cluster detects a throughput of each of a plurality of instances.

Further, in this embodiment of this application, the plurality of instances includes one primary instance and one or more secondary instances, and each node in the node cluster can identify which is the primary instance and which are the secondary instances. Each instance performs a service in real time based on a service request (for example, generating a block based on transaction information). In an actual operation, some instances have high efficiency in performing a service based on a service request, and some instances have low efficiency in performing a service based on a service request. Efficiency of each instance in performing a service can be determined by a throughput per unit time of the instance, and higher efficiency of an instance indicates a higher throughput per unit time. As mentioned above, each instance is participated in by all nodes (except failed nodes) in the node cluster, that is, all nodes (except the failed nodes) in the node cluster participate in running of the plurality of instances simultaneously such that each node in the node cluster can obtain the throughput of each of the plurality of instances.

Step S402: The node in the node cluster determines a target instance based on the detected throughput of each instance.

Figure 5:
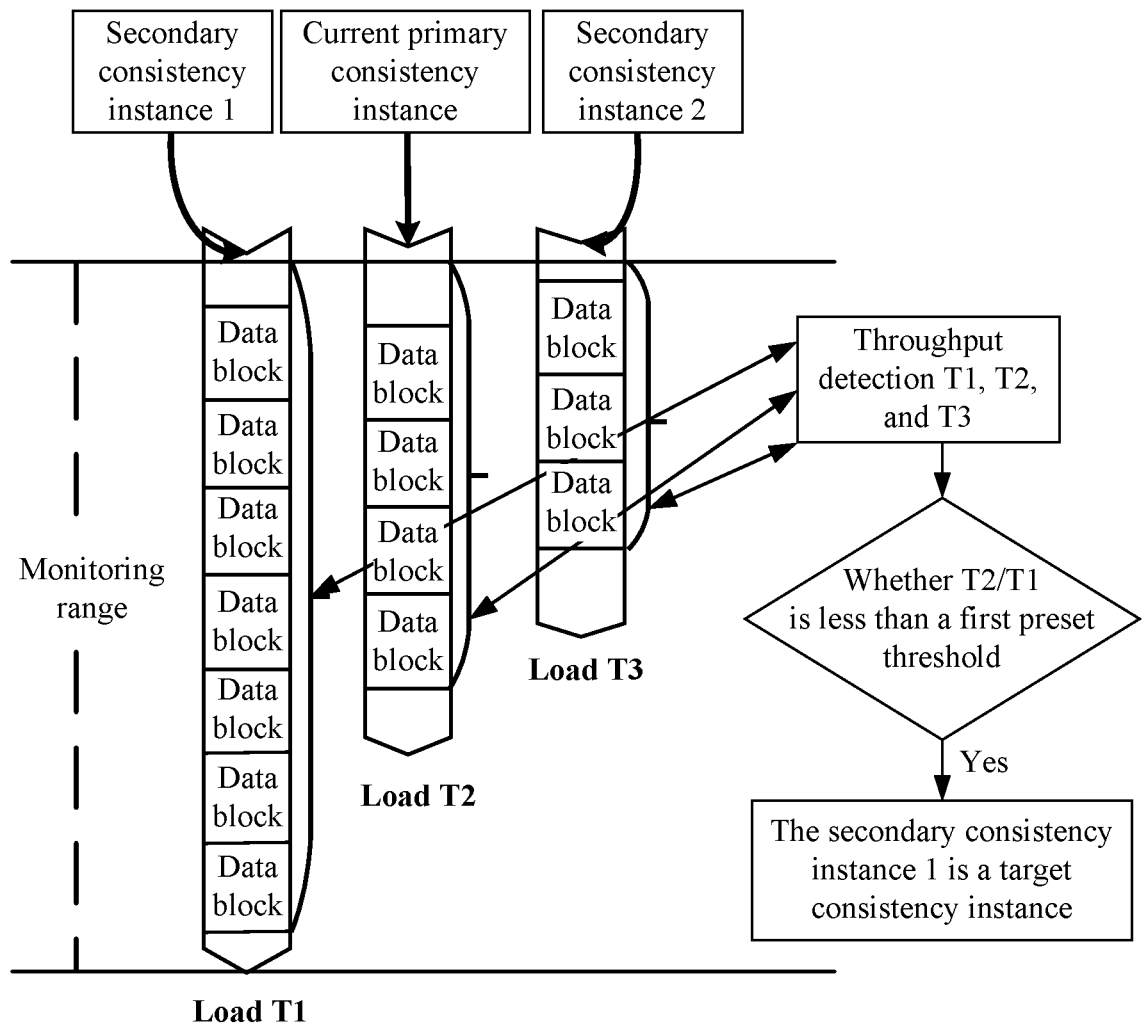
FIG. 5 is a schematic diagram of a scenario of measuring a throughput according to an embodiment of the present disclosure.

The target instance is a secondary instance that is in the one or more secondary instances and that has a throughput higher than a throughput of a to-be-replaced primary instance, for example, a secondary instance with a throughput higher than that of the to-be-replaced primary instance by a first preset threshold. The first preset threshold is a preset value used for reference comparison, and may be a parameter that indicates a throughput value, or may be a specified ratio, or may be a function expression, or the like. If there are a plurality of secondary instances with throughputs higher than that of the to-be-replaced primary instance by the first preset threshold, the target instance may be any one of the secondary instances, or may be one with a highest throughput, or may be one meeting a preset filtering criterion. For example, FIG. 5 illustrates throughputs of a plurality of instances, including a throughput T2 of the primary instance, a throughput T1 of a secondary instance 1, and a throughput T3 of a secondary instance 2. Because the throughput T1 of the secondary instance 1 is higher than the throughput T2 of the primary instance by the first preset threshold, the secondary instance 1 is the target instance.

In a first optional solution, each node in the node cluster determines a target instance and sends a first request message to a primary node of the target instance determined by the node, to request to substitute the target instance determined by the node as a primary instance. For example, the first request message may be a propose message with a signature <propose, sign_0>, where "propose" is used to request to substitute the target instance as a new primary instance, and "sign_0" is a signature, to "propose", of the node sending the propose message. Optionally, some nodes may determine different target instances such that these nodes separately send first request messages to primary nodes of the different target instances. Correspondingly, each primary node receives a first request message sent to the primary node, and determines whether a quantity of first request messages reaches a preset threshold. Herein, the preset threshold is a preset value used for reference comparison, and a quantity of first request messages received by only one of the primary nodes that receive the first request messages is greater than the preset threshold. Optionally, the preset threshold is equal to 2f+1, where f is a quantity of nodes that are in the node cluster and that may fail or may be unreliable. For example, f is less than or equal to $\lfloor(N-1)/3\rfloor$, where N is a total quantity of nodes in the node cluster, or certainly, f may be calculated or derived in other manners.

If a primary node of a target instance determines that a quantity of first request messages received by the primary node reaches the preset threshold, the primary node of the target instance may be referred to as a first node, and backup nodes of the target instance are referred to as second nodes. Subsequently, the first node needs to reach a consensus with each second node, to substitute the determined target instance as a new primary instance. A process of reaching, by the first node, the consensus with each second node is described in step S403.

In a second optional solution, the node cluster preconfigures (or votes) a node to determine a target instance. After determining the target instance, the node sends a first request message to a primary node of the determined target instance. The primary node of the target instance may be referred to as a first node, and backup nodes of the target instance are referred to as second nodes. After receiving the first request message, the first node needs to reach a consensus with each second node, to substitute the target instance as a new primary instance. A process of reaching, by the first node, the consensus with each second node is described in step S403.

In a third optional solution, after a node in the node cluster determines a target instance, if the node is a primary node of the determined target instance, the primary node of the target instance may be referred to as a first node, and backup nodes of the target instance are referred to as second nodes. The first node needs to reach a consensus with each second node, to substitute the target instance as a new primary instance. A process of reaching, by the first node, the consensus with each second node is described in step S403.

Step S403: The first node reaches a consensus with each second node, to substitute a target instance of a plurality of instances that are run by the node cluster as a new primary instance.

After the first node learns that the target instance needs to be substituted as the new primary instance, the first node negotiates with each second node in the node cluster. A purpose of negotiation is to substitute the target instance of the plurality of instances that are run by the node cluster as the new primary instance. An optional process of negotiation is as follows.

Step 1: The first node sends a replacement request to each second node, where the replacement request is used to instruct to substitute the target secondary instance as the new primary instance. The replacement request may be a candidate message with a signature <candidate, sign_1>, where "candidate" is used to instruct to substitute the target secondary instance as the new primary instance, and "sign_1" is a signature of the first node to "candidate".

Step 2: The second node receives the replacement request sent by the first node, and authenticates the replacement request. Optionally, a process of authenticating the replacement request includes authenticating the throughput of the target instance. Further, because the second node also participates in running of each instance, the second node can also learn the throughput of each instance. The second node determines whether the throughput of the target instance to which the first node instructs, using the replacement request, to switch is really higher than the throughput of the to-be-replaced primary instance by the first preset threshold, and if the throughput of the target instance is really higher than the throughput of the to-be-replaced primary instance by the first preset threshold, the authentication of the throughput of the target instance succeeds, otherwise, the authentication fails. In addition, the process of authenticating the replacement request further includes authenticating a signature in the replacement request, where signature authentication can achieve at least two purposes. Determine (1) whether the replacement request is sent by the first node, and (2) whether the replacement request has been tampered with during sending. If the replacement request is sent by the first node and has not been modified after being sent, the authentication of the signature in the replacement request succeeds.

To sum up, if the authentication of the replacement request succeeds, the second node generates second authentication information, and then sends the second authentication information to the first node. The second authentication information may be an agree message with a signature <agree, sign>, where "agree" is used to indicate that the authentication of the replacement request succeeds, and "sign" is a signature of the second node to "agree".

Step 3: The first node receives the second authentication information that is sent by the second node and that is about the replacement request. If a quantity of pieces of second authentication information received reaches a third preset threshold, it is considered that the first node reaches a consensus with each second node to substitute the target instance as the new primary instance such that the first node substitutes the target instance as the new primary instance. In addition, the first node sends second acknowledgement information to each second node, to instruct the second node to substitute the target instance as the new primary instance. The second acknowledgement information may be a commit message with a signature <commit, sign_0, sign_1, . . . sign 2f>, where "commit" is used to indicate to-be-indicated content of the second acknowledgement information, and "sign_0, sign_1, . . . sign_2f" successively are signatures of second nodes that send the second authentication information to the first node. In addition, the third preset threshold is a preset value used for reference comparison, and may be a parameter that indicates a throughput value, or may be a specified ratio, or may be a function expression, or the like. Optionally, the third preset threshold is equal to 2f, where f is a quantity of nodes that are in the node cluster and that may fail or may be unreliable. For example, f is less than or equal to ⌊(N−1)/3⌋, where N is a total quantity of nodes in the node cluster, or certainly, f may be calculated or derived in other manners.

Step 4: The second node receives the second acknowledgement information sent by the first node. The second node may obtain each signature in the second acknowledgement information, and may learn, based on the signature, that a quantity of nodes that send the second authentication information to the first node exceeds the third preset threshold, that is, a quantity of nodes agreeing to change the target instance into a primary instance exceeds the third preset threshold such that the second node substitutes the target instance as the new primary instance.

On the premise of the third optional solution, a plurality of nodes may be primary nodes of target instances determined by the nodes, and therefore a plurality of first nodes may respectively reach a consensus with corresponding second nodes. However, according to a consensus mechanism, only one first node finally reaches a consensus with a corresponding second node. That is, only one target instance is selected to replace the original primary instance to become a new primary instance. In addition, "reaching a consensus" in this embodiment of this application means that some nodes determine, through negotiation, to perform an operation. "Reaching a consensus" is a professional term in the art, and details are not described herein.

A consistency consensus process is as follows.

Figure 6:
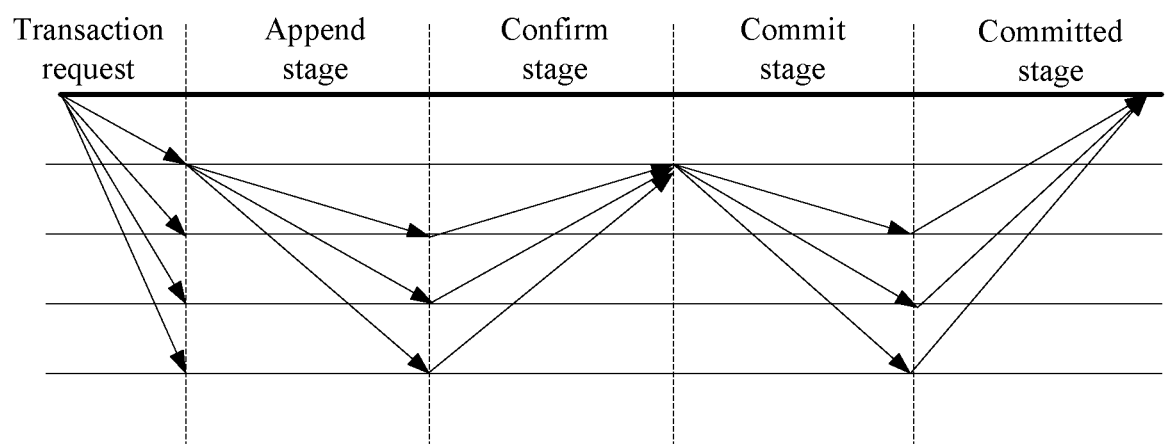
FIG. 6 is a schematic diagram of a scenario of a consensus process according to an embodiment of the present disclosure.

In an optional solution, a consistency consensus process performed by an instance on transaction information includes four stages: append, confirm, commit, and committed. As shown in FIG. 6, a detailed process is as follows.

Append stage: A first node sends a service request to each second node, where the service request is used to request the second node to perform a service. For example, the service may be transaction information reqinfo, and executing transaction information may be generating a block based on a transaction. Optionally, the service request <reqinfo, req_order, sign_2> includes the transaction information reqinfo, a signature sign_0 of the first node to the transaction information reqinfo, and a serial number req_order assigned to the transaction information.

Confirm stage: The second node receives the service request <reqinfo, req_order, sign_0> sent by the first node, and the second node authenticates the service request. If authentication of the signature sign_0 in the service request succeeds, and it is determined that the serial number req_order is not used and the serial number is the latest (for example, req_order is greater than any recorded serial number), the second node accepts a reqinfo message in the service request, that is, the authentication of the service request succeeds. Subsequently, the second node signs the service request to obtain first authentication information <reqinfo, req_order, sign_0, sign_1>, where "sign_1" is a signature of the second node to the service request <reqinfo, req_order, sign_0>. Then each second node sends the first authentication information <reqinfo, req_order, sign_0, sign_1> to the first node.

Commit stage: The first node receives the first authentication information <reqinfo, req_order, sign_0, sign_1> sent by the second node. If a quantity of first authentication information received exceeds a second preset threshold, the first node performs a service, for example, generating a first block of the transaction information (including writing the transaction information reqinfo and the corresponding serial number req_order in a block message queue). In addition, the first node further sends a first acknowledgement message <reqinfo, req_order, sign_0, sign_1, sign_2, sign_3, sign_4, ..., sign_N−1, sign_N> to each second node such that the second node also performs the service based on the service request. "sign_1, sign_2, sign_3, sign_4, ..., sign_N−1, sign_N" are signatures of different nodes to the service request <reqinfo, req_order, sign_0> (N is a positive integer), and are separately carried in the first authentication information sent by corresponding nodes to the first node. A signature of each node to <reqinfo, req_order, sign_0> is used to indicate that the node authenticates <reqinfo, req_order, sign_0> successfully. In addition, the second preset threshold is a preset value used for reference comparison, and may be a parameter that indicates a throughput value, or may be a specified ratio, or may be a function expression, or the like. Optionally, the second preset threshold is equal to 2f, where f is a quantity of nodes that are in the node cluster and that may fail or may be unreliable. For example, f is less than or equal to ⌊(N−1)/3⌋, where N is a total quantity of nodes in the node cluster, or certainly, f may be calculated or derived in other manners.

Committed stage: If the second node receives the first acknowledgement message sent by the first node, the second node determines, based on the signature of each node included in the first acknowledgement message, how many nodes have authenticated the first to-be-authenticated message <reqinfo, req_order, sign_0> successfully. If a quantity of nodes that succeed in the authentication exceeds the second preset threshold, the second node performs a service based on the service request, for example, generating a first block of the transaction information (including writing the transaction information reqinfo and the corresponding serial number req_order in a block message queue). Optionally, if the service is transaction information, the first node and the second node each may further send a first block generated by each of the first node and the second node to a device (or a client) that requests to perform consistency processing on the transaction information.

It can be learned that, in a consistency processing process, the second node of the target instance does not need to perform back-and-forth acknowledgement with other backup nodes of the target instance, and each backup node of the target instance can determine, only using first acknowledgement information that is sent by the first node and that carries signatures of backup nodes, whether backup nodes other than the backup node agree to perform the service request. Because mutual acknowledgement between the backup nodes is omitted, communication complexity is greatly reduced.

It should be noted that, the foregoing transaction information may be information about a single transaction, or may be information about a plurality of transactions. When the transaction information is information about a plurality of transactions, the information about the plurality of transactions may be sent by another device to the first node. For example, each node in the node cluster broadcasts transaction information received by the node to other nodes in the node cluster. For another example, a device outside the node cluster sends the information about the plurality of transactions to the first node. In a consistency consensus process, the first node assigns a total serial number to the plurality of transactions, and performs a consensus on the plurality of transactions as a unit (that is, one consistency consensus process needs to be performed for each transaction in the other approaches, however, herein, one consistency consensus process is performed for all of the plurality of transactions). Optionally, after receiving the service request, each second node traverses and authenticates each of the plurality of transactions. If validity authentication on a transaction has been completed locally before the service request is received, validity does not need to be authenticated again, otherwise, the validity of the transaction needs to be authenticated. If each of the plurality of transactions is authenticated successfully and an overall serial number assigned to the plurality of transactions is greater than an overall serial number of another plurality of transactions that are previously received, the transaction information is authenticated successfully. It can be understood that, when a consistency consensus process is performed for all of a plurality of transactions, a quantity of times of communication can be greatly reduced. Assuming that a consensus needs to be performed for k transactions on n nodes, if a consensus is separately performed for each transaction, communication complexity of the k transactions is O(kn), or if a consensus is performed for all of the k transactions, communication complexity of the k transactions may be expressed as O(n).

A primary node vote process is as follows.

In an optional solution, some of a plurality of backup nodes of any one of the plurality of instances are alternate primary nodes of the any one instance, and the alternate primary nodes of the any one instance are configured to replace a primary node of the any one instance to become a new primary node of the any one instance. Optionally, alternate primary nodes of any two instances are not duplicate. For example, during configuration of the plurality of instances, nodes in the node cluster are sorted, for example, sorted based on parameters such as hardware performance strength, an IP address, and a device name. If a quantity of instances in the plurality of instances is L, first L nodes in the sorting may be taken, and each of the L nodes serves as a primary node of an instance. Then an alternate primary node of each instance is selected from nodes other than the L nodes in the node cluster. Alternate primary nodes of the instances are not duplicate. For example, in the plurality of instances, an alternate primary node of a first instance is a node whose serial number is equal to 1+iL, an alternate primary node of a second instance is a node whose serial number is equal to 2+iL, . . . , and an alternate primary node of an $L^{th}$ instance is a node whose serial number is equal to L+iL, where i is a positive integer greater than or equal to 1. A specific value of i may be pre-defined to control a quantity of alternate primary nodes of each instance. Sorting of the L instances is not limited. Certainly, other manners may be alternatively used to ensure that the alternate primary nodes of the instances are not duplicate. Herein, the other manners are not illustrated one by one.

Figure 7:
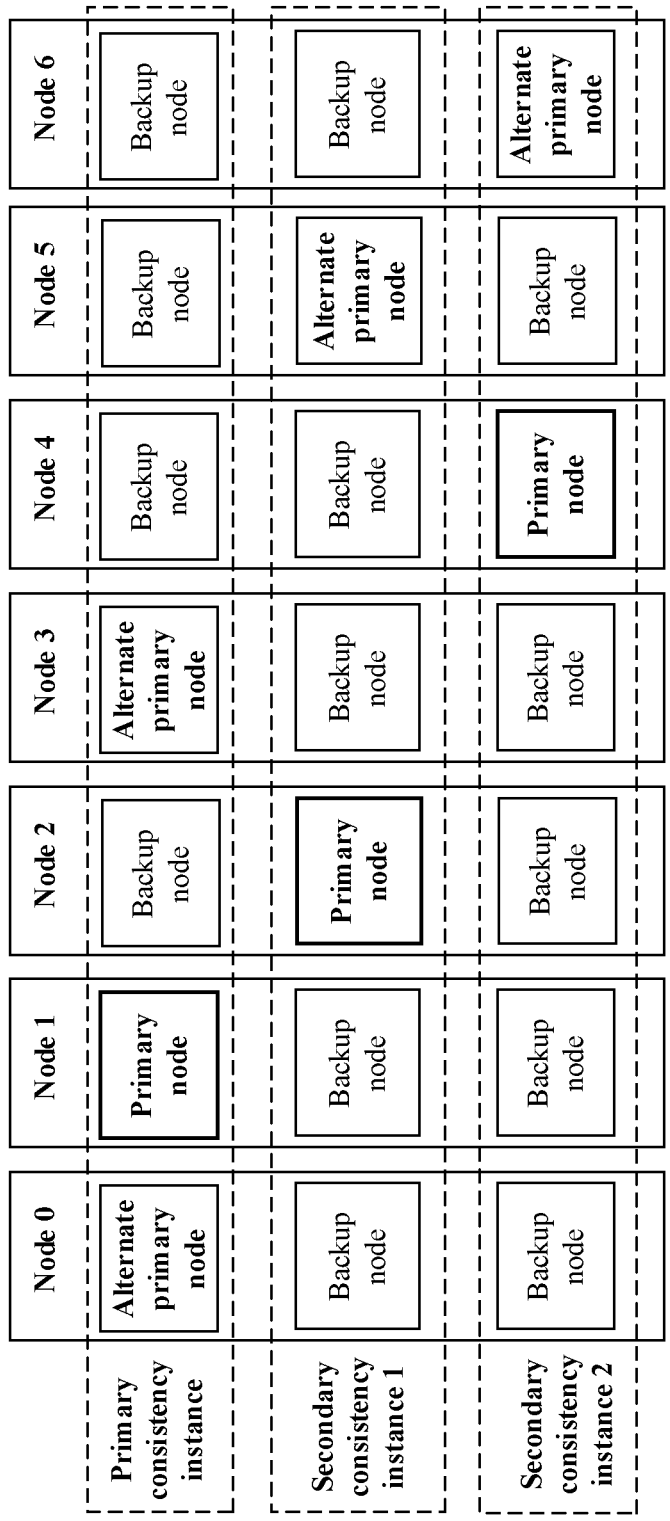
FIG. 7 is a schematic diagram of a scenario of voting a primary node according to an embodiment of the present disclosure.
Figure 8:
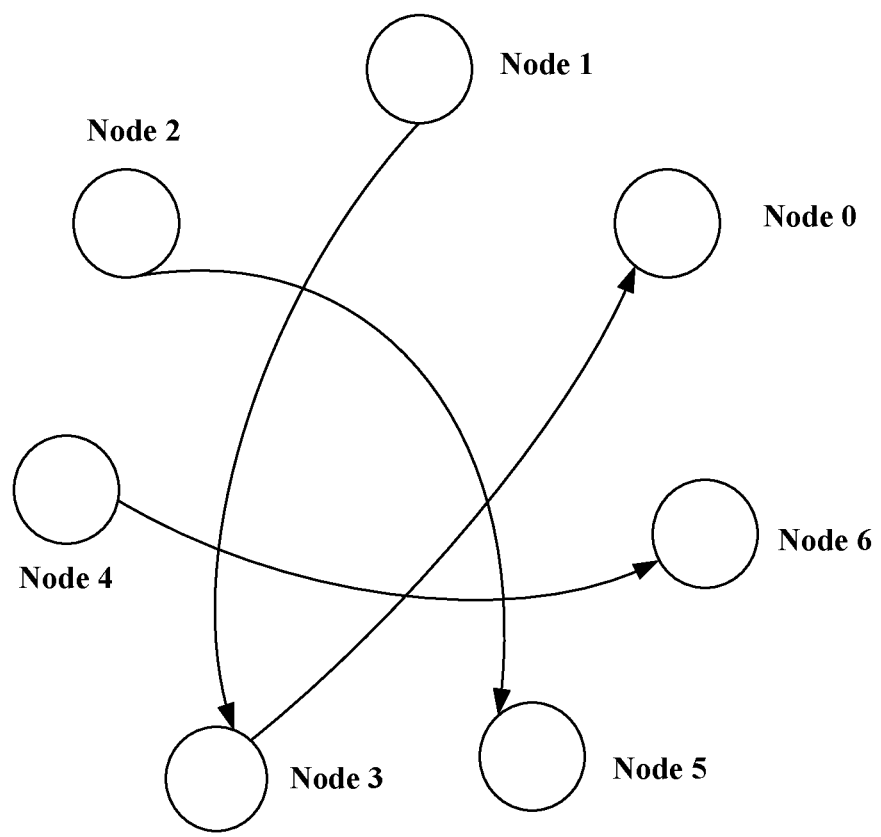
FIG. 8 is a schematic diagram of a scenario of voting a primary node according to an embodiment of the present disclosure.

Optionally, there is a priority order between the alternate primary nodes of the any one instance. Specific parameters based on which priorities of the alternate primary nodes are determined are not limited herein. Optionally, an alternate primary node sorted in the front has a higher priority. On this premise, the alternate primary nodes of the any one instance are configured to change to a new primary node of the any one instance when the primary node of the any one instance needs to be replaced. Further, according to the priority order, an alternate primary node that has a highest priority in the alternate primary nodes of the any one instance is configured to replace the primary node of the any one instance to become the new primary node of the any one instance. For example, as shown in FIG. 7, the plurality of instances includes a primary instance, a secondary instance 1, and a secondary instance 2. A primary node of the primary instance is a node 1, and alternate primary nodes are a node 3 and a node 0 in order (a priority of the node 3 is higher than a priority of the node 0). A primary node of the secondary instance 1 is a node 2, and an alternate primary node is a node 5. A primary node of the secondary instance 2 is a node 4, and an alternate primary node is a node 6. In this case, when the node 1 that serves as the current primary node of the primary instance fails, the node 3 is selected as a new primary node of the primary instance, and if the node 3 also fails, the node 0 is selected as a new primary node of the primary instance. When the node 2 that serves as the current primary node of the secondary instance 1 fails, the node 5 is selected as a new primary node of the secondary instance 1. If the node 4 that serves as the current primary node of the secondary instance 2 fails, the node 6 is selected as a new primary node of the secondary instance 2. FIG. 8 is a schematic diagram of a corresponding scenario.

Using an instance as an example, the following describes an optional process of voting a primary node. Each node in a node cluster sends vote information to an alternate primary node with a highest priority according to a priority order of alternate primary nodes of an instance, to instruct the alternate primary node with the highest priority to change to a new primary node. After receiving a preset quantity of pieces of vote information, the alternate primary node with the highest priority of the instance broadcasts vote commit (i.e., vote_commit) information, to indicate that a new current primary node of the instance is the alternate primary node with the highest priority of the instance. Then each node in the node cluster updates its own configuration information based on the vote_commit information such that the alternate primary node with the highest priority is configured as the new primary node of the instance. Optionally, the preset quantity is equal to $2\lfloor(N-1)/3\rfloor$.

In an optional solution, there is the following relationship between a quantity L of instances in the plurality of instances and a quantity N of nodes in the node cluster:

$$L \geq \left\lfloor \frac{N-1}{3} \right\rfloor + 1, N \geq 3.$$

Considerations for such a setting are as follows. There is a premise at the beginning of designing a byzantine fault tolerance mechanism, that is, up to f nodes in N nodes participating in a consensus are allowed to be unreliable (for example, tampering with transaction information or performing some non-compliance processing on the transaction information), where N≥3f+1. In the present disclosure, at least one of all the L instances is valid, otherwise, a consensus result is meaningless. A quantity of invalid instances that may occur is f, that is, each of the foregoing f unreliable nodes serves as a primary node of one instance. Therefore, provided that L≥f+1, it can be guaranteed that at least one valid instance exists. Based on the relationship between N and f and the relationship between f and L that are illustrated above, the relationship between the quantity L of instances and the quantity N of nodes can be obtained.

In the method described in FIG. 4, a node cluster jointly runs a plurality of instances, and when a primary instance cannot run normally, the node cluster directly selects a new primary instance from the plurality of instances, instead of performing a large amount of information exchange again to re-establish a new primary instance. Therefore, when the original primary instance cannot run normally, the new primary instance can immediately replace the original primary instance to perform consistency processing, thereby avoiding a relatively large delay of the consistency processing caused by replacing an instance.

Figure 9:
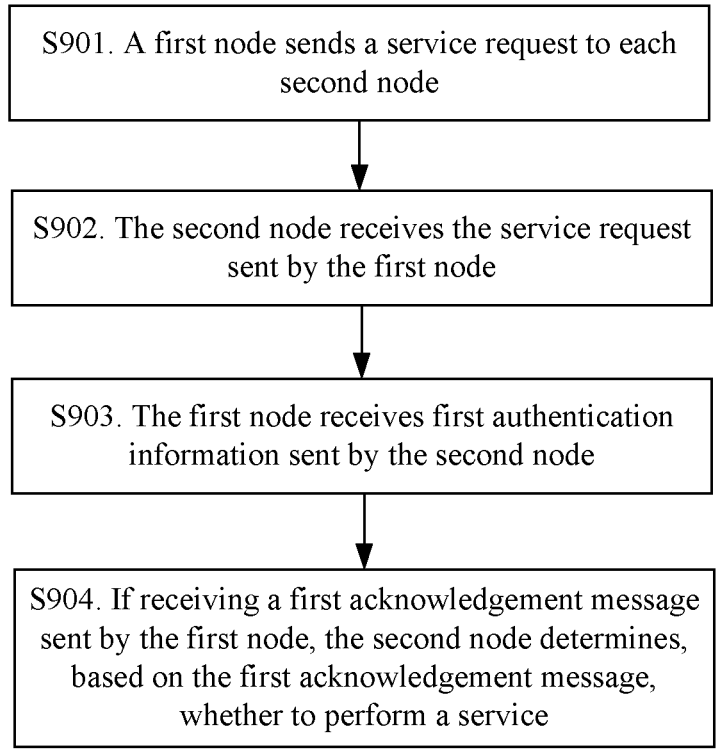
FIG. 9 is a schematic flowchart of a data consensus method according to an embodiment of the present disclosure.

FIG. 9 shows a data consensus method according to an embodiment of the present disclosure. The method may be implemented based on the node cluster shown in FIG. 1, or may be implemented based on another architecture. For example, the method runs in an architecture, where there are a plurality of nodes in the architecture, and the plurality of nodes run one instance, for another example, the method runs in an architecture, where there are a plurality of nodes in the architecture, and the plurality of nodes jointly run a plurality of instances, and the like. Regardless of whether the plurality of nodes run one instance or run a plurality of instances, a primary node of one of instances run by the plurality of nodes may be referred to as a first node, a backup node of the instance is referred to as a second node, and the instance is referred to as a target instance, to facilitate subsequent description. The method includes but is not limited to the following steps.

Step S901: The first node sends a service request to each second node, where the service request is used to request the second node to perform a service. For example, the service may be transaction information reqinfo, and executing transaction information may be generating a block based on a transaction. Optionally, the service request <reqinfo, req_order, sign_0> includes the transaction information reqinfo, a signature sign_0 of the first node to the transaction information reqinfo, and a serial number req_order assigned to the transaction information.

Step S901 is equivalent to the append stage in the consistency process shown in FIG. 6.

Step S902: The second node receives the service request <reqinfo, req_order, sign_0> sent by the first node, and the second node authenticates the service request. If authentication of the signature sign_0 in the service request succeeds, and it is determined that the serial number req_order is not used and the serial number is the latest (for example, req_order is greater than any recorded serial number), the second node accepts a reqinfo message in the service request, that is, the authentication of the service request succeeds. Subsequently, the second node signs the service request to obtain first authentication information <reqinfo, req_order, sign_0, sign_1>, where "sign_1" is a signature of the second node to the service request <reqinfo, req_order, sign 0>. Then each second node sends the first authentication information <reqinfo, req_order, sign 0, sign_1> to the first node.

Step S902 is equivalent to the confirm stage in the consistency process shown in FIG. 6.

Step S903: The first node receives the first authentication information <reqinfo, req_order, sign_0, sign_1> sent by the second node. If a quantity of pieces of first authentication information received exceeds a second preset threshold, the first node performs a service, for example, generating a first block of the transaction information (including writing the transaction information reqinfo and the corresponding serial number req_order in a block message queue). In addition, the first node further sends a first acknowledgement message <reqinfo, req_order, sign_0, sign_1, sign_2, sign_3, sign_4, . . . , sign_N–1, sign_N> to each second node such that the second node also performs the service based on the service request. "sign_1, sign_2, sign_3, sign_4, . . . , sign_N–1, sign_N" are signatures of different nodes to the service request <reqinfo, req_order, sign_0> (N is a positive integer), and are separately carried in the first authentication information sent by corresponding nodes to the first node. A signature of each node to <reqinfo, req_order, sign_0> is used to indicate that the node authenticates<reqinfo, req_order, sign_0> successfully. In addition, the second preset threshold is a preset value used for reference comparison, and may be a parameter that indicates a throughput value, or may be a specified ratio, or may be a function expression, or the like. Optionally, the second preset threshold is equal to 2f, where f is a quantity of nodes that are in the node cluster and that may fail or may be unreliable. For example, f is less than or equal to $\lfloor(N-1)/3\rfloor$, where N is a total quantity of nodes in the node cluster, or f may be calculated or derived in other manners.

Step S903 is equivalent to the commit stage in the consistency process shown in FIG. 6.

Step S904: If the second node receives the first acknowledgement message sent by the first node, the second node determines, based on the signature of each node included in the first acknowledgement message, how many nodes have authenticated the first to-be-authenticated message <reqinfo, req_order, sign 0> successfully. If a quantity of nodes that succeed in the authentication exceeds the second preset threshold, the second node performs a service based on the service request, for example, generating a first block of the transaction information (including writing the transaction information reqinfo and the corresponding serial number req_order in a block message queue). Optionally, if the service is transaction information, the first node and the second node each may further send a first block generated by each of the first node and the second node to a device (or a client) that requests to perform consistency processing on the transaction information.

Step S904 is equivalent to the committed stage in the consistency process shown in FIG. 6.

It can be learned that, in a consistency processing process, the second node of the target instance does not need to perform back-and-forth acknowledgement with other backup nodes of the target instance, and each backup node of the target instance can determine, only using first acknowledgement information that is sent by the first node and that carries signatures of backup nodes, whether backup nodes other than the backup node agree to perform the service request. Because mutual acknowledgement between the backup nodes is omitted, communication complexity is greatly reduced.

It should be noted that, the foregoing transaction information may be information about a single transaction, or may be information about a plurality of transactions. When the transaction information is information about the plurality of transactions, the information about the plurality of transactions may be sent by another device to the first node. For example, each node in the node cluster broadcasts transaction information received by the node to other nodes in the node cluster. For another example, a device outside the node cluster sends the information about the plurality of transactions to the first node. In a consistency consensus process, the first node assigns a total serial number to the plurality of transactions, and performs a consensus on the plurality of transactions as a unit (that is, one consistency consensus process needs to be performed for each transaction in the other approaches, however, herein, one consistency consensus process is performed for all of the plurality of transactions). Optionally, after receiving the service request, each second node traverses and authenticates each of the plurality of transactions. If validity authentication on a transaction has been completed locally before the service request is received, validity does not need to be authenticated again, otherwise, the validity of the transaction needs to be authenticated. If each of the plurality of transactions is authenticated successfully and an overall serial number assigned to the plurality of transactions is greater than an overall serial number of another plurality of transactions that are previously received, the transaction information is authenticated successfully. It can be understood that, when a consistency consensus process is performed for all of a plurality of transactions, a quantity of times of communication can be greatly reduced. Assuming that a consensus needs to be performed for k transactions on n nodes, if a consensus is separately performed for each transaction, communication complexity of the k transactions is O(kn), or if a consensus is performed for all of the k transactions, communication complexity of the k transactions may be expressed as O(n).

The method in the embodiments of the present disclosure is described in detail above, and an apparatus in the embodiments of the present disclosure is provided below.

Figure 10:
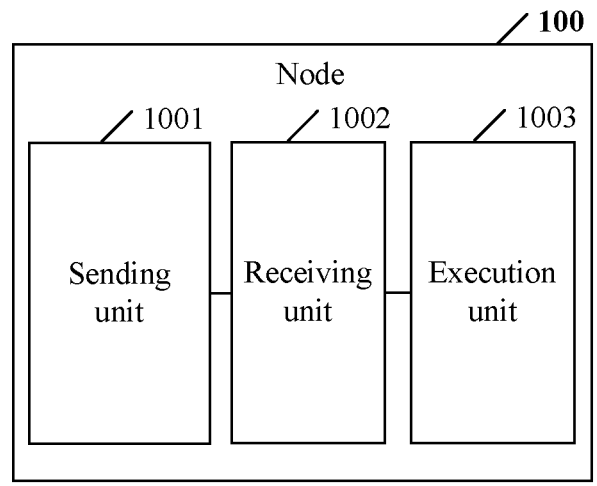
FIG. 10 is a schematic structural diagram of a node according to an embodiment of the present disclosure.

FIG. 10 is a schematic structural diagram of a node 100 according to an embodiment of the present disclosure. The node 100 includes a sending unit 1001, a receiving unit 1002, and an execution unit 1003. Detailed descriptions of the units are as follows.

The sending unit 1001 is configured to send a service request to each of second nodes, where the node 100 is a primary node running an instance, and the second node is a backup node running the instance.

The receiving unit 1002 is configured to receive first authentication information returned by the second node, where the first authentication information includes a signature of the second node, and the first authentication information indicates that the second node authenticates the service request successfully.

The execution unit 1003 is configured to perform the service request when a quantity of pieces of first authentication information received by the receiving unit 1002 exceeds a second preset threshold.

The sending unit 1001 is configured to send first acknowledgement information to each of the second nodes, where the first acknowledgement information includes the service request and signatures that are of the second nodes and that are in all the first authentication information received by the node, and the first acknowledgement information is used to enable the second node to perform the service request.

It should be noted that, for an implementation of each unit, reference may be further made to the corresponding description of the method embodiment shown in FIG. 9. The node 100 shown in FIG. 10 is the first node in the method embodiment shown in FIG. 9.

It can be learned that, in a consistency processing process, the second node of the instance does not need to perform back-and-forth acknowledgement with other backup nodes of the instance, and each backup node of the instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

Figure 11:
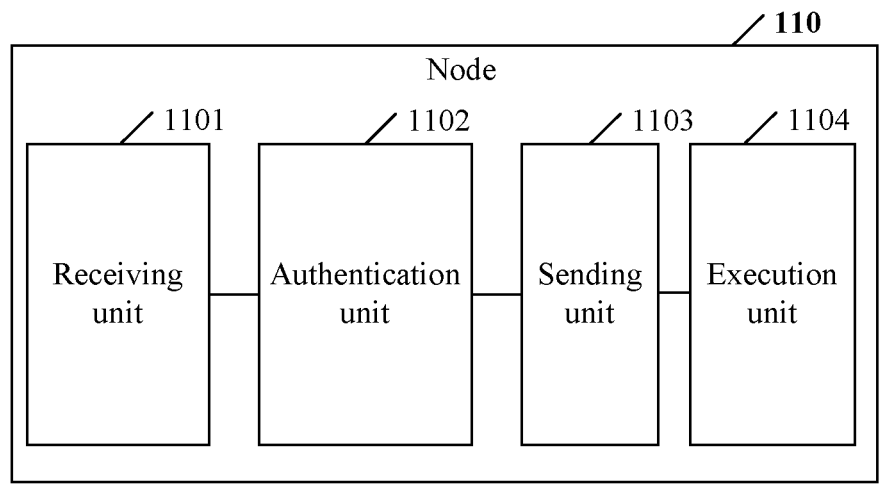
FIG. 11 is a schematic structural diagram of a node according to an embodiment of the present disclosure.

FIG. 11 is a schematic structural diagram of a node 110 according to an embodiment of the present disclosure. The node 110 includes a receiving unit 1101, an authentication unit 1102, a sending unit 1103, and an execution unit 1104. Detailed descriptions of the units are as follows.

The receiving unit 1101 is configured to receive a service request sent by a first node, where the first node is a primary node running an instance, and the node 110 is a backup node running the instance.

The authentication unit 1102 is configured to authenticate the service request to generate first authentication information, where the first authentication information includes a signature of the node 110, and the first authentication information indicates that the node 110 authenticates the service request successfully.

The sending unit 1103 is configured to send the first authentication information to the first node such that the first node performs the service request and sends a first acknowledgement message to the node 110 when a quantity of pieces of first authentication information received exceeds a second preset threshold, where the first acknowledgement message includes the signature that is of the node and that is in all the first authentication information received by the first node.

The execution unit 1104 is configured to perform the service request based on the first to-be-authenticated information when the first acknowledgement message sent by the first node is received.

It should be noted that, for an implementation of each unit, reference may be further made to the corresponding description of the method embodiment shown in FIG. 9. The node 110 shown in FIG. 11 is the second node in the method embodiment shown in FIG. 9.

It can be learned that, in a consistency processing process, the second node of the instance does not need to perform back-and-forth acknowledgement with other backup nodes of the instance, and each backup node of the instance can determine, only using first acknowledgement information that is sent by the first node and that carries signatures of backup nodes, whether backup nodes other than the backup node agree to perform the service request. Because mutual acknowledgement between the backup nodes is omitted, communication complexity is greatly reduced.

Figure 12:
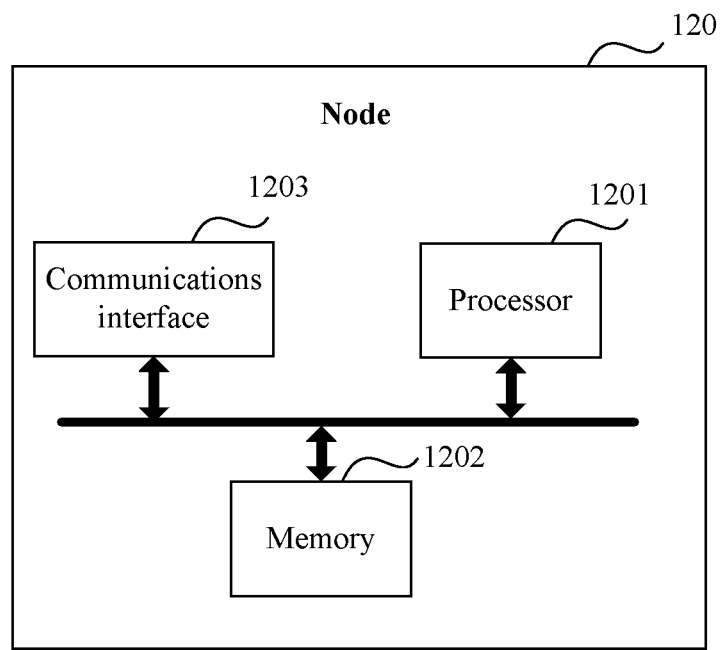
FIG. 12 is a schematic structural diagram of a node according to an embodiment of the present disclosure.

FIG. 12 shows a node 120 according to an embodiment of the present disclosure. The node 120 includes a processor 1201, a memory 1202, and a communications interface 1203. The processor 1201, the memory 1202, and the communications interface 1203 are connected to each other using a bus.

The memory 1202 includes but is not limited to a random access memory (RAM), a read-only memory (ROM), an erasable programmable ROM (EPROM), or a compact disc (CD) ROM (CD-ROM). The memory 1202 is configured to store a related instruction and related data. The communications interface 1203 is configured to receive and send data.

The processor 1201 may be one or more central processing units (CPUs). When the processor 1201 is one CPU, the CPU may be a single-core CPU, or may be a multi-core CPU.

The processor 1201 in the node 120 is configured to read program code stored in the memory 1202, to perform the following operations of sending, using the communications interface 1203, a service request to each of second nodes, where the node 120 is a primary node running an instance, and the second node is a backup node running the instance, receiving, using the communications interface 1203, first authentication information returned by the second node, where the first authentication information includes a signature of the second node, and the first authentication information indicates that the second node authenticates the service request successfully, if a quantity of pieces of first authentication information received using the communications interface 1203 exceeds a second preset threshold, performing the service request, and sending, using the communications interface, first acknowledgement information to each of the second nodes, where the first acknowledgement information includes the service request and signatures that are of the second nodes and that are in all the first authentication information received by the node 120, and the first acknowledgement information is used to enable the second node to perform the service request.

It should be noted that, for an implementation of each unit, reference may be further made to the corresponding description of the method embodiment shown in FIG. 9. The node 120 shown in FIG. 12 is the first node in the method embodiment shown in FIG. 9.

It can be learned that, in a consistency processing process, the second node of the instance does not need to perform back-and-forth acknowledgement with other backup nodes of the instance, and each backup node of the instance can determine, only using the first acknowledgement information that is sent by the first node and that carries signatures of backup nodes, whether backup nodes other than the backup node agree to perform the service request. Because mutual acknowledgement between the backup nodes is omitted, communication complexity is greatly reduced.

Figure 13:
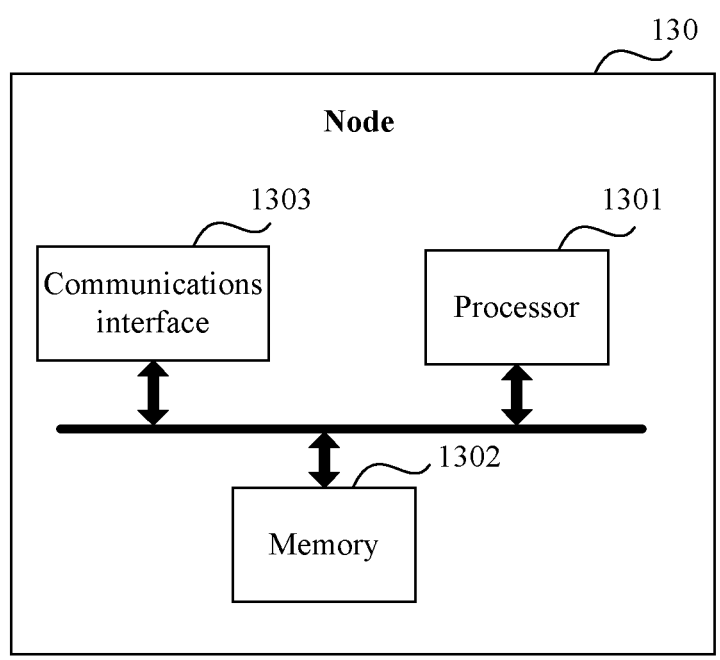
FIG. 13 is a schematic structural diagram of a node according to an embodiment of the present disclosure.

FIG. 13 shows a node 130 according to an embodiment of the present disclosure. The node 130 includes a processor 1301, a memory 1302, and a communications interface 1303. The processor 1301, the memory 1302, and the communications interface 1303 are connected to each other using a bus.

The memory 1302 includes but is not limited to a RAM, a ROM, an EPROM, or a CD-ROM. The memory 1302 is configured to store a related instruction and related data. The communications interface 1303 is configured to receive and send data.

The processor 1301 may be one or more CPUs. When the processor 1301 is one CPU, the CPU may be a single-core CPU, or may be a multi-core CPU.

The processor 1301 in the node 130 is configured to read program code stored in the memory 1302, to perform the following operations of receiving, using the communications interface 1303, a service request sent by a first node, where the first node is a primary node running an instance, and the node 130 is a backup node running the instance, authenticating the service request to generate first authentication information, where the first authentication information includes a signature of the node 130, and the first authentication information indicates that the node 130 authenticates the service request successfully, sending, using the communications interface 1303, the first authentication information to the first node such that the first node performs the service request and sends a first acknowledgement message to the node 130 when a quantity of pieces of first authentication information received exceeds a second preset threshold, where the first acknowledgement message includes the signature that is of the node 130 and that is in all the first authentication information received by the first node, and if the first acknowledgement message sent by the first node is received using the communications interface 1303, performing the service request based on the first to-be-authenticated information.

It should be noted that, for an implementation of each unit, reference may be further made to the corresponding description of the method embodiment shown in FIG. 9. The node 130 shown in FIG. 13 is the second node in the method embodiment shown in FIG. 9.

It can be learned that, in a consistency processing process, the second node of the instance does not need to perform back-and-forth acknowledgement with other backup nodes of the instance, and each backup node of the instance can determine, only using first acknowledgement information that is sent by the first node and that carries signatures of backup nodes, whether backup nodes other than the backup node agree to perform the service request. Because mutual acknowledgement between the backup nodes is omitted, communication complexity is greatly reduced.

An embodiment of the present disclosure further provides a chip system. The chip system includes at least one processor, a memory, and an interface circuit. The memory, the interface circuit, and the at least one processor are interconnected using a line. The at least one memory stores an instruction, and when the instruction is executed by the processor, the method process shown in FIG. 4 is implemented.

An embodiment of the present disclosure further provides a computer readable storage medium. The computer readable storage medium stores an instruction, and when the instruction is run on a processor, the method process shown in FIG. 4 is implemented.

An embodiment of the present disclosure further provides a computer program product. When the computer program product runs on a processor, the method process shown in FIG. 4 is implemented.

A person of ordinary skill in the art may understand that all or some of the processes of the methods in the embodiments may be implemented by a computer program instructing relevant hardware. The program may be stored in a computer readable storage medium. When the program performs, the processes of the methods in the embodiments are performed. The storage medium includes any medium that can store program code, for example, a ROM, a RAM, a magnetic disk, or a CD.

What is claimed is:

1. A consensus method implemented by a first node, comprising:
   sending a service request to M backup nodes, wherein the first node is a primary node running an instance, wherein the M backup nodes are backup nodes running the instance, and wherein M is a positive integer;
   receiving N pieces of first authentication information from N backup nodes, wherein the N pieces of the first authentication information comprise N signatures of the N backup nodes generating the N pieces of the first authentication information, wherein the N pieces of the first authentication information indicate that the N backup nodes successfully authenticated the service request, and wherein N is a positive integer less than or equal to M;
   identifying that N exceeds a first preset threshold;
   performing the service request in response to identifying that N exceeds the first preset threshold; and
   sending first acknowledgement information to the M backup nodes, wherein the first acknowledgement information comprises the N signatures, and wherein the first acknowledgement information enables the M backup nodes to perform the service request.

2. The consensus method of claim 1, wherein a node cluster comprises the first node and the M backup nodes, wherein the first node and the M backup nodes jointly run the instance, wherein a plurality of instances comprises a primary instance and a secondary instance, wherein the first node is the primary node running a target instance of the instances, wherein the M backup nodes are the backup nodes running the target instance, wherein the consensus method further comprises obtaining, using the M backup nodes, a consensus to replace the primary instance with the target instance as a new primary instance, and wherein a throughput of the target instance is higher than a throughput of the primary instance.

3. The consensus method of claim 2, wherein $$L \geq \left\lfloor \frac{K-1}{3} \right\rfloor + 1,$$

wherein L represents a quantity of the instances, wherein K represents a quantity of nodes in the node cluster, wherein K=M+1, and wherein K is an integer greater than or equal to three.

4. The consensus method of claim 1, wherein a backup node running the instance is an alternate primary node of the instance, and wherein the alternate primary node is configured to replace the primary node running the instance to become a new primary node running the instance.

5. The consensus method of claim 4, wherein alternate primary nodes running two different instances are different.

6. The consensus method of claim 4, wherein alternate primary nodes running the instance comprise different priorities, and wherein an alternate primary node comprising a highest priority is configured to replace the primary node to become the new primary node.

7. A consensus method implemented by a second node, comprising:
  receiving a service request from a first node, wherein the first node is a primary node running an instance, wherein the second node is one of M backup nodes running the instance, and wherein M is a positive integer;
  authenticating the service request to generate first authentication information, wherein the first authentication information comprises a signature of the second node, and wherein the first authentication information indicates that the second node successfully authenticated the service request;
  sending the first authentication information to the first node;
  receiving a first acknowledgement message from the first node, wherein the first acknowledgement message comprises respective signatures of N backup nodes, wherein the first acknowledgement message indicates that a quantity N of pieces of first authentication information received by the first node exceeds a first preset threshold, and wherein N is a positive integer less than or equal to M; and
  performing the service request.

8. The consensus method of claim 7, wherein a node cluster comprises the first node and the M backup nodes, wherein the first node and the M backup nodes jointly run the instance, wherein a plurality of instances comprises a primary instance and a secondary instance, wherein the first node is the primary node running a target instance of the instances, wherein the second node is one of the M backup nodes running the target instance, wherein the consensus method further comprises obtaining, using the first node, a consensus to replace the primary instance with the target instance as a new primary instance, and wherein a throughput of the target instance is higher than a throughput of the primary instance.

9. The consensus method of claim 8, wherein $$L \geq \left\lfloor \frac{K-1}{3} \right\rfloor + 1,$$

wherein L represents a quantity of the instances, wherein K represents a quantity of nodes in the node cluster, wherein K=M+1, and wherein K is an integer greater than or equal to three.

10. The consensus method of claim 7, wherein a backup node running the instance is an alternate primary node of the instance, and wherein the alternate primary node is configured to replace the primary node running the instance to become a new primary node running the instance.

11. The consensus method of claim 10, wherein alternate primary nodes running two different instances are different.

12. The consensus method of claim 10, wherein alternate primary nodes running the instance comprises different priorities, and wherein an alternate primary node comprising a highest priority is configured to replace the primary node to become the new primary node.

13. A cluster system, comprising:
  M backup nodes configured to run an instance, wherein M is a positive integer; and
  a first node coupled to the M backup nodes, wherein the first node is a primary node running the instance, and wherein the first node is configured to:
    send a service request to the M backup nodes;
    receive N pieces of first authentication information from N backup nodes, wherein the N pieces of the first authentication information comprise N signatures of the N backup nodes generating the N pieces of the first authentication information, wherein the N pieces of the first authentication information indicate that the N backup nodes generating the N pieces of the first authentication information successfully authenticated the service request, and wherein N is a positive integer less than or equal to M;
    identifying that N exceeds a first preset threshold;
    perform the service request in response to identifying that N exceeds the first preset threshold; and
    send first acknowledgement information to the M backup nodes, wherein the first acknowledgement information comprises the N signatures, and wherein the first acknowledgement information enables the M backup nodes to perform the service request, and
  wherein the M backup nodes are configured to:
    receive the service request from the first node;
    authenticate the service request to generate the first authentication information;
    send the first authentication information to the first node;
    receive the first acknowledgement information from the first node; and
    perform the service request based on the service request.

14. The cluster system of claim 13, wherein the first node and the M backup nodes jointly run the instance, wherein a plurality of instances comprise a primary instance and a secondary instance, wherein the first node is the primary node running a target instance of the instances, wherein a second node is one of the M backup nodes running the target instance, wherein the first node is further configured to obtain a consensus with the M backup nodes to replace the primary instance with the target instance as a new primary instance, and wherein a throughput of the target instance is higher than a throughput of the primary instance.

* * * * *